United States Patent [19]

Ovshinsky et al.

[11] Patent Number: 4,487,818
[45] Date of Patent: Dec. 11, 1984

[54] FUEL CELL ANODE BASED ON A DISORDERED CATALYTIC MATERIAL

[75] Inventors: Stanford R. Ovshinsky, Bloomfield Hills; Krishna Sapru, Troy; Arie Reger, Birmingham, all of Mich.

[73] Assignee: Energy Conversion Devices, Inc., Troy, Mich.

[21] Appl. No.: 399,876

[22] Filed: Jul. 19, 1982

[51] Int. Cl.$^3$ .............................................. H01M 4/86
[52] U.S. Cl. ........................................ 429/44; 429/45;
204/293; 502/101; 502/527
[58] Field of Search ..................... 429/44, 45, 40;
252/466 R, 470, 449, 477 R, 425.3, 477 Q;
204/292, 293

[56] References Cited

U.S. PATENT DOCUMENTS 3,961,987 6/1976 Mund et al. .......................... 429/44
4,192,907 3/1980 Jalan et al. ........................ 429/44 X
4,255,247 3/1981 Oda et al. ......................... 429/44 X Primary Examiner—Anthony Skapars
Attorney, Agent, or Firm—Lawrence G. Norris

[57] ABSTRACT

An anode for hydrogen oxidation in a fuel cell is formed from a host matrix including at least one transition element which is structurally modified by the incorporation of at least one modifier element to improve its catalytic properties. The catalytic body is based on a disordered non-equilibrium material designed to have a high density of catalytically active sites, resistance to poisoning, and long operating life. Modifier elements, including Ti, Mo, Zr, Mg, V, Si or Al, structurally modify the local chemical environments of a nickel or other transition element host matrix to form the catalytic materials of the anode. The improved low overvoltage catalytic materials of the anode of the present invention increase the operating efficiencies of fuel cells employing such anodes. The catalytic materials can be deposited as a layer on the surface of porous electrode substrates to form a gas diffusion anode or can be formed as a gas diffusion electrode.

37 Claims, 1 Drawing Figure

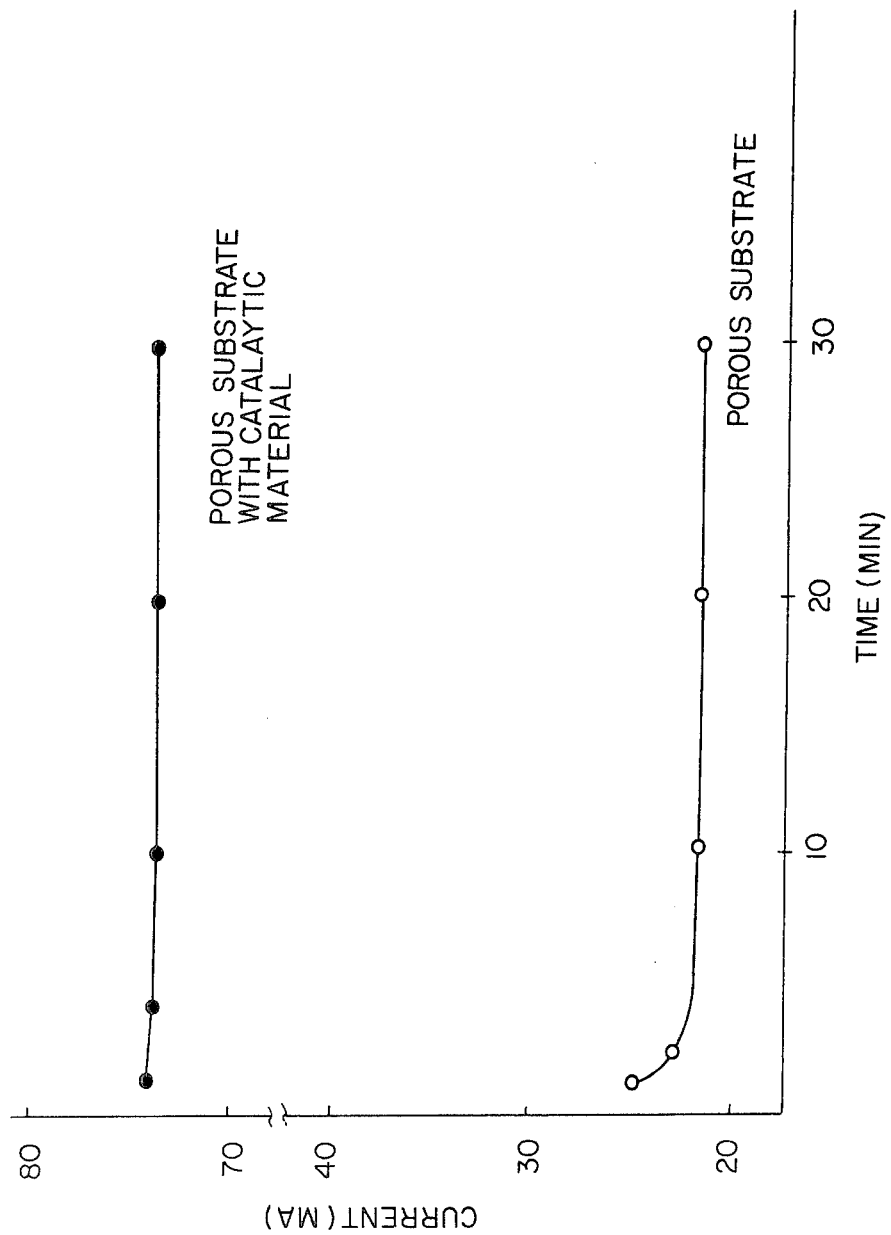

FUEL CELL ANODE BASED ON A DISORDERED CATALYTIC MATERIAL

BACKGROUND OF THE INVENTION

The present invention relates generally to catalytic bodies and more specifically to catalytic bodies for use as anodes in an alkaline fuel cell. The catalytic body of the invention is based on a disordered non-equilibrium material designed to have a high density of catalytically active sites, resistance to poisoning, and long operating life.

A fuel cell is an electrochemical device in which the chemical energy of a conventional fuel is converted directly and efficiently into low voltage electrical energy. Fuel cells have many potential applications such as supplying power for transportation vehicles, replacing steam turbines and remote power supply applications.

Fuel cells, like conventional batteries, operate by utilizing electrochemical reactions. Unlike a battery, in which chemical energy is stored within the cell, fuel cells generally are supplied with reactants from outside the cell. Barring failure of the electrodes, as long as the fuel, preferably hydrogen, and oxidant, typically oxygen, are supplied and the reaction products are removed, the cell continues to operate.

Fuel cells also offer a number of important advantages over engine or generator systems. These include relatively high efficiency, environmentally clean operation especially when utilizing hydrogen as a fuel, high reliability, few moving parts, and quiet operation. Fuel cells potentially are more efficient than other conventional power sources based upon the Carnot cycle. As the world's oil supplies become depleted, hydrogen supplies remain quite abundant and offer a viable alternate source of energy. Hydrogen can be produced from coal or natural gas or can be produced without the use of fossil fuels, such as by the electrolysis of water using nuclear or solar energy.

The major components of a typical fuel cell are the anode for hydrogen oxidation and the cathode for oxygen reduction, both being positioned in a cell containing an electrolyte such as an alkaline electrolytic solution. Typically, the reactants such as hydrogen and oxygen, are respectively fed through a porous anode and cathode and brought into surface contact with the electrolytic solution. The particular materials utilized for the cathode and anode are important since they must act as efficient catalysts for the reactions taking place.

In an alkaline fuel cell, the reaction at the anode is between the hydrogen fuel and hydroxyl ions ($OH^-$) present in the electrolyte which react to form water and release electrons: $H_2 + 2OH^- \rightarrow 2H_2O + 2e^-$. At the cathode, the oxygen, water, and electrons react in the presence of the cathode catalyst to reduce the oxygen and form hydroxyl ions ($OH^-$): ($O_2 + 2H_2O + 4e^- \rightarrow 4OH^-$). The flow of electrons is utilized to provide electrical energy for a load externally connected to the anode and cathode.

Despite the above listed potential advantages, fuel cells have not been widely utilized. Contributing to the fuel cell's lack of widescale commercial acceptance has been the relatively high cost of operating the fuel cells. An important factor contributing to the relatively high cost of producing energy from a fuel cell are the catalytic inefficiencies of the prior art catalytic materials used for the electrodes and/or the high costs of many of these materials. The catalytic inefficiencies of the materials add to the operating costs of the fuel cell since a lower electrical energy output for a given amount of fuel results. The use of expensive catalytic materials, such as noble metal catalysts, result in cells which are too expensive for widespread application.

The only alkaline fuel cells presently utilized are based upon noble metal catalysts and because of potential poisoning utilize ultrahigh purity fuels and electrolytes. These very expensive cells are only utilized for space applications where cost is not a factor. Virtually no commercial applications presently utilize alkaline fuel cells.

For example, one prior art fuel cell anode catalyst is platinum. Platinum, despite its good catalytic properties, is not very suitable for widescale commercial use as a catalyst for fuel cell anodes, because of its very high cost. Noble metal catalysts like platinum, also cannot withstand contamination by impurities normally contained in the hydrogen fuel and the electrolyte of the fuel cell. These impurities can include carbon monoxide which may be present in hydrogen fuel or contaminants contained in the electrolyte such as the impurities normally contained in untreated water including calcium, magnesium, iron, and copper.

The above contaminants can cause what is commonly referred to as a "poisoning" effect. Poisoning occurs where the catalytically active sites of the material become inactivated by poisonous species invariably contained in the fuel cell. Once the catalytically active sites are inactivated, they are no longer available for acting as catalysts for efficient hydrogen oxidation reaction at the anode. The catalytic efficiency of the anode therefore is reduced since the overall number of available catalytically active sites is significantly lowered by poisoning. The decrease in catalytic activity results in increased overvoltage at the anode and hence the cell is much less efficient adding significantly to the operating costs. Overvoltage is the voltage required to overcome the resistance to the passage of current at the surface of the anode (charge transfer resistance). The overvoltage represents an undesirable energy loss which adds to the operating costs of the fuel cell.

The reduction of the overvoltage at the anode to lower operating cost of fuel cells has been the subject of much attention in the prior art. More specifically, the attention has been directed at the reduction of overvoltage caused by the charge transfer resistance at the surface of the anode due to catalytic inefficiencies of the particular anode materials utilized.

One prior art attempt to increase the catalytic activity of fuel cell anodes was to use a "Raney" nickel anode. Raney nickel production involves the formation of a multicomponent mixture, such as nickel and aluminum, followed by the selective removal of the aluminum, to increase the actual surface area of the material for a given geometric surface area. The resulting surface area for Raney nickel anodes is typically on the order of 100–1000 times greater than the geometric area of the material.

The Raney nickel catalyst is very unstable, because it is quite susceptible to oxidation in ambient air and consequently must be protected from contact with air when not submersed in the fuel cell. Furthermore, the process for producing Raney nickel is relatively costly due to the expense of the various metallurgical processes involved.

The shortcomings of Raney nickel anode catalysts, as well as many other anode catalysts proposed in the prior art, is that these catalysts are generally based upon a crystalline structure. In a crystalline structure the catalytically active sites which provide the catalytic effect of such materials result primarily from accidently occurring, surface irregularities which interrupt the periodicity of the crystalline lattice. A few examples of such surface irregularities are dislocation sites, crystal steps, surface impurities and foreign adsorbates. A major problem with a crystalline structure is that the number of such irregularities forming the catalytically active sites are relatively few and occur only on the surface of the crystalline lattice. This results in the catalytic material having a density of catalytically active sites which is relatively low. Thus, the catalytic efficiency of the material is substantially less than that which would be possible if a greater number of catalytically active sites were available for the hydrogen oxidation reaction. Such catalytic inefficiencies result in a reduction in the fuel cell efficiency.

Thus, high catalytic efficiency from a relatively low cost material and resistance to poisoning in a fuel cell environment remain as desired results which must be attained before widescale commercial utilization of fuel cells is possible. Prior art fuel cell anode catalysts, which have been generally predicated on either expensive noble metal catalysts or crystalline structures with a relatively low density of catalytically active sites, have not been able to meet the requirements.

SUMMARY OF THE INVENTION

The disadvantages of the prior art which have prevented the wide scale use of fuel cells are overcome by greatly improving and expanding in a unique and fundamental way the characteristics of the hydrogen oxidation electrode by utilizing disordered non-equilibrium multicomponent catalytic materials. The materials can be tailor-made to exhibit optimum catalytic activity for hydrogen oxidation by having greater density of active sites, resistance to poisoning, and long operating life.

The improved fuel cell anodes are formed from non-equilibrium metastable highly disordered materials formed by modification techniques. The technique of modification to provide a non-equilibrium material having a high degree of disorder provides unique bonding configurations, orbital overlap and hence a spectrum of catalytically active sites for the hydrogen oxidation reaction. The modification technique involves tailoring of the local structural and chemical order of the materials of the present invention and is of great importance to achieve the desired characteristics. Amorphous materials having only short range order can be utilized as can crystalline materials having long range order, but where the structure is deliberately modified to increase the density of catalytically active sites above that obtainable in the prior art.

The improved catalytic activity of the present invention is accomplished by manipulating the local chemical order and hence the local structural order by the incorporation of selected modifier elements into a selected host matrix to create the desired disordered material. The disordered multicomponent materials may be amorphous, polycrystalline (but lacking long range order) or microcrystalline in structure, or an intimate mixture of amorphous and polycrystalline or microcrystalline phases.

The tailor-made materials include a host matrix including at least one transition element, and at least one modifier element introduced into the host matrix in a non-equilibrium manner. The incorporation of the modifier element or elements in this manner provides the desired disordered structure of the material and creates numerous local structural and chemical environments which act as catalytically active sites for the hydrogen oxidation reaction in a fuel cell anode. Nickel is an example of a transition element particularly suitable for forming the host matrix. A few examples of the preferred modifier elements include transition elements such as Ti, V, Mo, and Zr and other elements such as Mg, Si, or Al.

The catalytic materials of the present invention can be utilized for gas diffusion fuel cell anodes utilizing conventional techniques and also by applying a thin layer of the catalytic material onto a previously formed gas diffusion electrode substrate. Vacuum deposition techniques, such as cosputtering the matrix and modifier elements, is a particularly suitable method of applying the catalytic materials for gas diffusion anodes.

BRIEF DESCRIPTION OF THE DRAWINGS

The FIGURE is a plot of current vs. time for two porous gas diffusion electrode devices showing the greatly improved performance obtained with a gas diffusion electrode having a layer of catalytic material of the present invention compared to a gas diffusion electrode substrate without such a layer.

DETAILED DESCRIPTION

The fuel cell anode of the present invention is based upon a unique approach to catalysis. This approach involves the design of multicomponent disordered materials having tailor-made local structural chemical environments which yield desirable catalytic characteristics. The anodes are designed to have a high density of active sites, resistance to poisoning, and long operating life to provide efficient low cost fuel cell operation. The manipulation of local structural and chemical environments to provide catalytically active sites is made possible by utilization of a host matrix which is, in accordance with the present invention, structurally modified with at least one modifier element to create a spectrum of bonding arrangements to provide a greatly increased density of catalytically active sites. With a greater density of catalytically active sites, the hydrogen oxidation reaction occurs much more readily to allow a more efficient hydrogen oxidation reaction and hence reduce operating costs of the fuel cell.

The increased number of catalytically active sites not only increases the energy output for a given amount of hydrogen, but enables the materials to be more resistant to poisoning. This is because with materials of the present invention a certain number of catalytically active sites can be sacrificed to the effects of poisonous species while a large number of unpoisoned sites still remain to provide the desired catalysis for hydrogen oxidation. Also, some of the poisons are inactivated by being bonded to other sites without effecting the active sites.

The disordered materials of the present invention, unlike the specific and rigid structure of crystalline materials, are ideally suited for manipulation since they are not constrained by the symmetry of a crystalline lattice or by stoichiometry. By moving away from materials having restrictive crystalline symmetry it is possible by selectively modifying in accordance with the present invention to accomplish a significant alteration of the local structural chemical environments involved in hydrogen oxidation to enhance the catalytic properties of the anode materials. The disordered materials of the present invention can be modified in a substantially continuous range of varying percentages of modifier elements. This ability allows the host matrix to be manipulated by the modifier elements to tailor-make or engineer materials with characteristics suitable for hydrogen oxidation. This is in contrast to crystalline materials which generally have a very limited range of stoichiometry available and thus a continuous range of control of chemical and structural modification of such crystalline materials is not possible.

In the disordered materials of the present invention, it is possible to attain unusual electronic configurations resulting from nearest neighbor interactions between lone pairs, microvoids, dangling bonds, and unfilled or vacant orbitals. These unusual electronic configurations can interact with the modifier elements of the present invention which are incorporated into the host matrix to readily modify the local structural chemical order and thus the electronic configurations of the matrix to provide numerous catalytically active sites for hydrogen oxidation.

The disorder of the modified material can be of an atomic nature in the form of compositional or configurational disorder provided throughout the bulk of the material or in numerous regions of the materials. The disorder can also be introduced into the material by creating microscopic phases within the material which mimic the compositional or configurational disorder at the atomic level by virtue of the relationship of one phase to another. For example, the disordered materials can be created by introducing microscopic regions of a different kind or kinds of crystalline phases, or introducing regions of an amorphous phase or phases in addition to regions of a crystalline phase or phases. The interfaces between these various phases can provide surfaces which are rich in local chemical environments providing numerous catalytically active sites.

A major advantage of the disordered materials of the present invention is that they can be tailor-made to provide a very high density and variety of catalytically active sites relative to the materials based upon a crystalline structure. The types of structures which provide the local structural chemical environments for improved catalytic efficiency in accordance with the present invention include multicomponent polycrystalline materials lacking long range compositional order, microcrystalline materials, amorphous materials having one or more phases, or multiphase materials containing both amorphous and crystalline phases or mixtures thereof.

As discussed later in greater detail, modification of the host matrix element or elements to form the catalytic materials of the present invention can be accomplished by a variety of methods. One type of formation involves vacuum deposition techniques, (i.e., sputtering, vapor deposition or plasma deposition). With these techniques the catalytically active material of the present invention can be directly applied to the electrode surface. In these methods, the host matrix element or elements are co-deposited along with the modifier element or elements to form a layer of catalytic material on the surface of a substrate or preformed porous gas diffusion electrode.

Material Preparation

A number of materials as indicated in the following tables were prepared and tested to illustrate the advantages of the catalytic materials of the present invention. The materials referred to hereinafter were prepared and tested in general accordance with the following procedures except where noted otherwise.

The catalytic activity of the materials was first tested by co-depositing the materials on a suitable conductive substrate, such as nickel. Other electrodes were prepared utilizing a gas diffusion porous nickel based substrate with a layer of catalytic material deposited thereon. The substrates were sandblasted to remove surface oxides and to roughen the surfaces to provide better adhesion for the later applied layer of catalytic material. The substrate was placed in a vacuum chamber of a Veeco R.F. sputtering unit, a Sloan Magnetron 1800 sputtering unit, or a Mathis sputtering unit. The chamber was evacuated to a background pressure of $1 \times 10^{-6}$ torr or lower. Argon gas was introduced into the chamber at a partial pressure of approximately $6.0 \times 10^{-3}$ torr. When sputtering was accomplished with the Veeco or Mathis the sputtering target included a surface of sections of the elements desired to be included in the catalytic layer. The relative percentages of the elements contained in the deposited disordered materials were dependent upon the relative sizes of the sections of the target dedicated to the component elements and the positioning of the substrate relative to the target.

With the Sloan 1800 Magnetron sputtering unit, however, each element which was to be a component of the final catalytic layer had a separate target dedicated only to that element and the relative percentages of the component elements deposited in the catalytic layer were controlled by adjustment of the magnetic flux associated with each target as is well known by those skilled in this art. Regardless of whether the materials were produced utilizing the Mathis or Sloan Units, the substrate was maintained at a relatively low temperature, for example 50° C. to 150° C., to aid in the formation of the desired disordered structure. The thickness of the catalytic layers deposited on the substrate were on the order of ½ to 50 microns.

Cosputtering is a particularly advantageous method for rapid screening or for forming the catalytic materials because it allows an intimate mixing on an atomic scale of the material's component elements. Thus, the transition element host and modifier elements can be deposited in non-equilibrium metastable manner, in accordance with the invention, to tailor-make the desired disordered structure and create new local chemical environments providing the catalytically active sites.

Generally, the anodes were etched in HCl to remove oxides and other contaminants from their surfaces prior to testing. The chemical composition of the catalytic layer was determined by energy dispersive spectroscopy or Auger spectroscopy. All chemical compositions stated in the following tables are given in atomic percentages.

Except as noted, each anode was separately tested in a test cell containing a 4 M NaOH electrolyte at a temperature of approximately 70° C. Hydrogen gas for use as the fuel was provided to the interface of the anode's catalytic surface and the electrolyte. A platinum gauze counter electrode was utilized in the test cell. Measurements were taken for peak voltage at various cyclic voltammetry scan rates as indicated in the tables below. These measurements were taken vs. a Hg/HgO reference electrode. The peak potential is the potential at which the maximum current is obtained and is indicative of the catalytic activity of an electrode material. Materials of greater catalytic activity exhibit a peak potential which has an absolute value which is higher than that of a less active material.

For a comparison to the catalytic activity of the prior art nickel and platinum anodes, a nickel anode and a platinum anode were prepared and tested under the same operating conditions as were the materials of the present invention. The nickel anode was prepared by sputtering a thin layer of nickel on a nickel substrate. The platinum anode was prepared by sputtering a thin layer of platinum onto another nickel substrate. The nickel anode provided a −810 mV peak potential at 10 mV/sec. cyclic voltammetry setting, while the platinum anode provided a −920 mV peak potential at 20 mV/sec. cyclic voltammetry setting.

TABLE 1

HYDROGEN ELECTRO-OXIDATION RESULTS OF THE Ni—Ti CATALYST

| Ti Content % by At. Wt. | Cyclic Voltammetry at 10 mV/Sec. Ep (mV) | Cyclic Voltammetry at 20 mV/Sec. Ep (mV) |
| --- | --- | --- |
| 2 | −830 | −820 |
| 4 | −840 | −830 |
| 10 | −905 | −905 |
| 25 | −895 | −880 |
| 34 | −880 | −855 |

Table 1 includes some representative peak potentials of anodes formed from a nickel host matrix modified with titanium. It can be seen that the highest peak voltages were obtained by nickel modified by between 10% and 25% of Ti.

A number of the anode materials were prepared as previously described with the additional step of heat treating the electrodes in hydrogen gas at 300° C. prior to the etching step. Both of the materials containing 7% and 19% Ti provide excellent peak potentials. These test results are shown in Table 2.

TABLE 2

HYDROGEN ELECTRO-OXIDATION RESULTS OF THE Ni—Ti CATALYST

| Ti Content % by At. Wt. | Cyclic Voltammetry at 10 mV/Sec. Ep (mV) | Cyclic Voltammetry at 20 mV/Sec. Ep (mV) |
| --- | --- | --- |
| 1 | −832 | −805 |
| 3 | −852 | −845 |
| 7 | −905 | −905 |
| 19 | −912 | −905 |
| 30 | −860 | −840 |

TABLE 3

HYDROGEN ELECTRO-OXIDATION RESULTS OF THE Ni—Zr CATALYST

| Zr Content % by At. Wt. | Cyclic Voltammetry at 5 mV/Sec. Ep (mV) |
| --- | --- |
| 2% | −840 |
| 3% | −843 |
| 6% | −884 |
| 7% | −900 |
| 14% | −894 |
| 25% | −899 |
| 29% | −858 |
| 36% | −850 |

Table 3 shows representative materials having Ni modified with Zr. The materials with approximately 6% to 25% Zr provide peak potentials which indicate catalytic activity which is significantly better than nickel. The optimum performance is obtained with a material modified with about 7% Zr.

TABLE 4

HYDROGEN ELECTRO-OXIDATION RESULTS OF THE Ni—V CATALYST

| V Content % by At. Wt. | Cyclic Voltammetry at 20 mV/Sec. Ep (mV) |
| --- | --- |
| 11 | −810 |
| 15 | −825 |
| 24 | −860 |
| 40 | −850 |
| 53 | −835 |

Nickel modified with vanadium also was found to provide good catalytic activity for the fuel cell anode reaction. A series of materials were prepared with Ni modified by V ranging from approximately 10% to 53%. As indicated in Table 4, the NiV modified materials having a V content of over approximately 15% provided the highest catalytic activity.

TABLE 5

HYDROGEN ELECTRO-OXIDATION RESULTS OF THE Ni—Ti—Mo CATALYST

| Mo Content % by At. Wt. | Cyclic Voltammetry at 20 mV/Sec. Ep (mV) |
| --- | --- |
| 7% | −815 mV |
| 10% | −815 mV |
| 12% | −815 mV |
| 15% | −850 mV |
| 27% | −860 mV |
| 44% | −830 mV |

In another series of materials, two transition metal elements, Ni and Ti, formed the host matrix which was modified with Mo. For the NiTiMo series of materials, each had a host matrix wherein the ratio of Ni to Ti atoms was approximately 2.0 to 2.5. The host matrices were modified with Mo to produce materials ranging from 7% to 44% Mo content.

It was generally found that the performance of the NiTiMo anodes improved as the potential was continuously scanned. For example, an overnight cycling of a NiTiMo anode, shifted its peak potential from approximately −815 mV to −900 mV.

Also indicative of the catalytic properties of a material is the exchange current density. The exchange current density is an electrochemical rate constant for the anode reaction under equilibrium conditions and may be calculated according to the following equation:

$$i_o = \frac{ivRT}{\eta nF}$$

where $i_o$ is the exchange current density, i is the current density, n is the activation overvoltage, $\nu$ is the stoichiometric number, F is the Faraday constant, R is the gas constant, n is the number of the electrons in the reaction and T is the temperature in °K. Table 6 shows some representative exchange current densities for various materials of the present invention.

TABLE 6
EXCHANGE CURRENT DENSITIES FOR VARIOUS MATERIALS OF THE INVENTION, IN A 4 M KOH ELECTROLYTE

| Material Composition Atomic Percentages | Electrolyte Temperature (°C.) | $i_o$ (mA/cm$^2$) |
|---|---|---|
| $Ni_{57}Mg_{43}$ | 55 | .28 |
| $Ni_{64}Ti_{36}$ | 70 | .21 |
| $Ni_{68}Ti_{22}V_{10}$ | 70 | .23 |
| $Ni_{76}V_{24}$ | 50 | .19 |

As can be seen from the above Table all of these materials have a high exchange current density with the best results having been obtained by the NiMg material. These results compare very favorably to exchange current densities given for prior art catalytic materials such as .1 mA/cm$^2$ for sintered nickel bodies with a platinum catalyst; $3 \times 10^{-3}$ mA/cm$^2$ for titanium Raney nickel, and $4 \times 10^{-4}$ mA/cm$^2$ for Raney nickel.

In addition to the specific modifier elements discussed above, other modifier elements can be used to increase catalytic activity of the materials of the present invention. In addition to the transition elements other modifier elements which are believed to provide increased activity for the fuel cell catalysts of the present invention include Al and Si. The modifier elements discussed above and those shown in the tables can be utilized in various combinations with Ni or other transition element host matrices to form many different multicomponent disordered catalytic materials suitable for use as a fuel cell anode catalyst.

Also, while the materials of the above Tables were formed by cosputtering the host and modifier elements onto a solid electrode substrate, the invention is not so limited. For example, as noted previously, a layer of catalytic materials may be applied, such as by cosputtering, onto a previously formed porous gas diffusion electrode. The layer, which preferably is ½ to 2 microns thick is applied to the surface of the porous electrode substrate which is to contact the electrolyte during operation of the electrode. Application of catalytic material as a thin layer to the electrode surface also allows the use of a much smaller amount of catalytic materials compared to incorporation of the catalyst throughout the bulk of the electrode.

FIG. 1 shows two curves comparing the performance of a nickel based porous electrode substrate to that of an identical substrate having a layer of catalytic material of the present invention deposited on its surface. The cosputtered catalytic material had a thickness of approximately 1 micron and was determined to have a $Ni_{72}Ti_{20}Al_8$ composition before leaching out a portion of the aluminum. All the electrodes tested had geometrical areas of 2.5 cm.

Each electrode was separately tested as a hydrogen gas diffusion electrode in a half cell utilizing a room temperature 4 M KOH electrolyte and a platinum counter electrode. An anodic overvoltage of 120 mV was applied to the anode and the currents obtained at optimum hydrogen backing pressure were measured. As can be seen in FIG. 1 the electrode with the layer of catalytic material provided greatly improved performance over the porous substrate without a layer of catalytic material of the present invention.

A similar comparison was also conducted at various electrolyte temperatures. It was found that at elevated temperatures the enhanced performance of the porous electrode with the catalytic layer was maintained or improved. For example, at 22° C. the current obtained using the porous substrate was approximately 18 mA and was increased to approximately 44 mA for the electrode with a $Ni_{72}Ti_{20}Al_8$ catalytic layer. At 70° C. the current density of these electrodes were approximately 70 mA and 110 mA, respectively.

While the present invention has been described in conjunction with specific embodiments, those of normal skill in the art will appreciate that numerous modifications and variations can be made without departing from the scope of the present invention, and such modifications and variations are envisioned to be within the scope of the appended claims.

What is claimed and desired to be secured by Letters Patent of the United States is:

1. A fuel cell comprising:
    at least one anode means for efficient hydrogen oxidation, said anode means being formed from a compositionally disordered non-equilibrium multicomponent catalytic material, said anode means including a host matrix having at least one transition element and incorporating at least one modifier element;
    a casing having said anode means positioned therein;
    at least one cathode capable of oxygen reduction positioned within said casing and spaced from said anode means; and
    an electrolyte in contact with both said cathode and said anode means.

2. The fuel cell as defined in claim 1 wherein said anode means include means designed to include a plurality of chemical elements for providing a large number of catalytically active sites.

3. The fuel cell as defined in claim 1 wherein said anode means include means designed to provide local chemical environments which include sites for selectively inactivating poisonous species.

4. The fuel cell as defined in claim 1 wherein said anode means include means for oxidizing hydrogen at low overvoltages.

5. The fuel cell as defined in claim 1 wherein said disordered material includes a designed internal porosity to enhance the hydrogen oxidation characteristics.

6. The fuel cell as defined in claim 1 wherein said material has non-equilibrium metastable phases and configurations.

7. The fuel cell as defined in claim 1 wherein said catalytic material is heat treated in a hydrogen atmosphere.

8. The fuel cell as defined in claim 1 wherein said modifier element is aluminum which is at least partially selectively removed from said material to further structurally modify said material and increase the catalytic activity of said material and form a porous material.

9. The fuel cell as defined in claim 1 wherein said disordered material is a substantially polycrystalline multicomponent material lacking long range compositional order.

10. The fuel cell as defined in claim 1 wherein said disordered material is a substantially microcrystalline material.

11. The fuel cell as defined in claim 1 wherein said disordered material is a mixture of polycrystalline or microcrystalline phase regions and amorphous phase regions.

12. The fuel cell as defined in claim 1 wherein said disordered material is an amorphous material containing at least one amorphous phase.

13. The fuel cell as defined in claim 1 wherein said disordered material is a mixture of microcrystalline and polycrystalline phases.

14. The fuel cell as defined in claim 1 wherein said anode means include a porous gas diffusion substrate and said catalytic material is deposited in a layer on at least a portion of said substrate.

15. The fuel cell as defined in claim 1 wherein said host matrix includes Ni.

16. The fuel cell as defined in claim 1 wherein said modifier element is a transition element.

17. The fuel cell as defined in claim 1 wherein said modifier element is selected from the group consisting of Ti, Zr, Mo, V, Mg, Si and Al.

18. The fuel cell as defined in claim 1 wherein said anode means include means for increasing the current density at temperatures above ambient temperature.

19. A fuel cell anode comprising: a multicomponent compositionally disordered non-equilibrium catalytic material including a host matrix having at least one transition element and having incorporated therein one or more modifier elements, said modifier element modifying the local structural chemical environments of said material to provide said disorder, said material including means creating an increased density of catalytically active sites for the hydrogen oxidation reaction.

20. The anode as defined in claim 19 wherein said means include a plurality of chemical elements for providing a large number of catalytically active sites.

21. The anode as defined in claim 19 wherein said means include means designed to provide local chemical environments which include sites for selectively inactivating poisonous species.

22. The anode as defined in claim 19 wherein said means include means for oxidizing hydrogen at low overvoltages.

23. The anode as defined in claim 19 wherein said disordered material includes a designed internal porosity to enhance the hydrogen oxidation characteristics.

24. The anode as defined in claim 19 wherein said means has non-equilibrium metastable phases and configurations.

25. The anode as defined in claim 19 wherein said catalytic material is heat treated in a hydrogen atmosphere.

26. The anode as defined in claim 19 wherein said modifier element is aluminum which is at least partially selectively removed from said material to further structurally modify said material and increase the catalytic activity of said material and form a porous material.

27. The anode as defined in claim 19 wherein said disordered material is a substantially polycrystalline multicomponent material lacking long range compositional order.

28. The anode as defined in claim 19 wherein said disordered material is a substantially microcrystalline material.

29. The anode as defined in claim 19 wherein said disordered material is a mixture of polycrystalline or microcrystalline phase regions and amorphous phase regions.

30. The anode as defined in claim 19 wherein said disordered material is an amorphous material containing at least one amorphous phase.

31. The anode as defined in claim 19 wherein said disordered material is a mixture of microcrystalline and polycrystalline phases.

32. The anode as defined in claim 19 wherein said anode means include a porous gas diffusion substrate and said catalytic material is deposited in a layer on at least a portion of said substrate.

33. The anode as defined in claim 19 wherein said host matrix includes Ni.

34. The anode as defined in claim 19 wherein said modifier element is a transition element.

35. The anode as defined in claim 19 wherein said modifier element is selected from the group consisting of Ti, Zr, Mo, V, Mg, Si and Al.

36. The anode as defined in claim 19 wherein said material is formed by cosputtering.

37. The anode as defined in claim 19 wherein said means include means for increasing the current density at temperatures above ambient temperature.

* * * * *